US010212584B2

(12) United States Patent
Yao et al.

(10) Patent No.: US 10,212,584 B2
(45) Date of Patent: Feb. 19, 2019

(54) NETWORK REGISTRATION SYSTEM FOR REGISTERING COMMUNICATOR ON NETWORK AND NETWORK DEVICE THEREFOR

(71) Applicant: Oki Electric Industry Co., Ltd., Tokyo (JP)

(72) Inventors: Taketsugu Yao, Tokyo (JP); Masanori Nozaki, Tokyo (JP); Yuzuru Igarashi, Tokyo (JP); Yoshihisa Nakano, Tokyo (JP); Kiyoshi Fukui, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 201 days.

(21) Appl. No.: 14/307,823

(22) Filed: Jun. 18, 2014

(65) Prior Publication Data
US 2015/0079984 A1    Mar. 19, 2015

(51) Int. Cl.
*H04W 12/00* (2009.01)
*H04W 8/06* (2009.01)

(52) U.S. Cl.
CPC .............. *H04W 12/00* (2013.01); *H04W 8/06* (2013.01)

(58) Field of Classification Search
CPC .................................................... H04W 60/00
See application file for complete search history.

(56) References Cited

U.S. PATENT DOCUMENTS

| 8,205,073 | B2 | 6/2012 | Ishidoshiro | |
| 8,520,234 | B2 * | 8/2013 | Otani | H04L 41/26 |
| | | | | 358/1.15 |
| 2004/0029576 | A1 * | 2/2004 | Flykt | H04L 63/0869 |
| | | | | 455/422.1 |
| 2007/0184837 | A1 * | 8/2007 | Hohl | H04L 63/08 |
| | | | | 455/435.1 |
| 2010/0165875 | A1 * | 7/2010 | Kneckt | H04W 8/005 |
| | | | | 370/254 |

(Continued)

FOREIGN PATENT DOCUMENTS

| JP | 63-108848 A | 5/1988 |
| JP | 2005-142907 A | 6/2005 |

(Continued)

*Primary Examiner* — Charles N Appiah
*Assistant Examiner* — Frank E Donado
(74) *Attorney, Agent, or Firm* — Rabin & Berdo, P.C.

(57) ABSTRACT

In a network registration system including a communicator to be registered on a network and a register registering the communicator on the network, either of the communicator and the register includes a check information generator generating a check information signal according to check information for prompting the user to check that the communicator is treated as an object to be registered in the network registration system; and a check information output section outputting the check information signal in a form sensible to the user. The other of the communicator and the register includes an evaluation criterion supplier supplying evaluation criterion information allowing the user to evaluate the suitability of the check information emitted from the check information output section. Thus, the network registration system can prevent an incorrect registration while easily registering the communicator to the network.

16 Claims, 10 Drawing Sheets

(56) References Cited

U.S. PATENT DOCUMENTS

2010/0231432 A1* 9/2010 Shigei .................... G08C 17/02
                                                    341/176
2013/0276140 A1* 10/2013 Coffing .................. H04W 4/21
                                                    726/27

FOREIGN PATENT DOCUMENTS

JP      2007-135760 A    6/2007
JP      2007-523551 A    8/2007

* cited by examiner

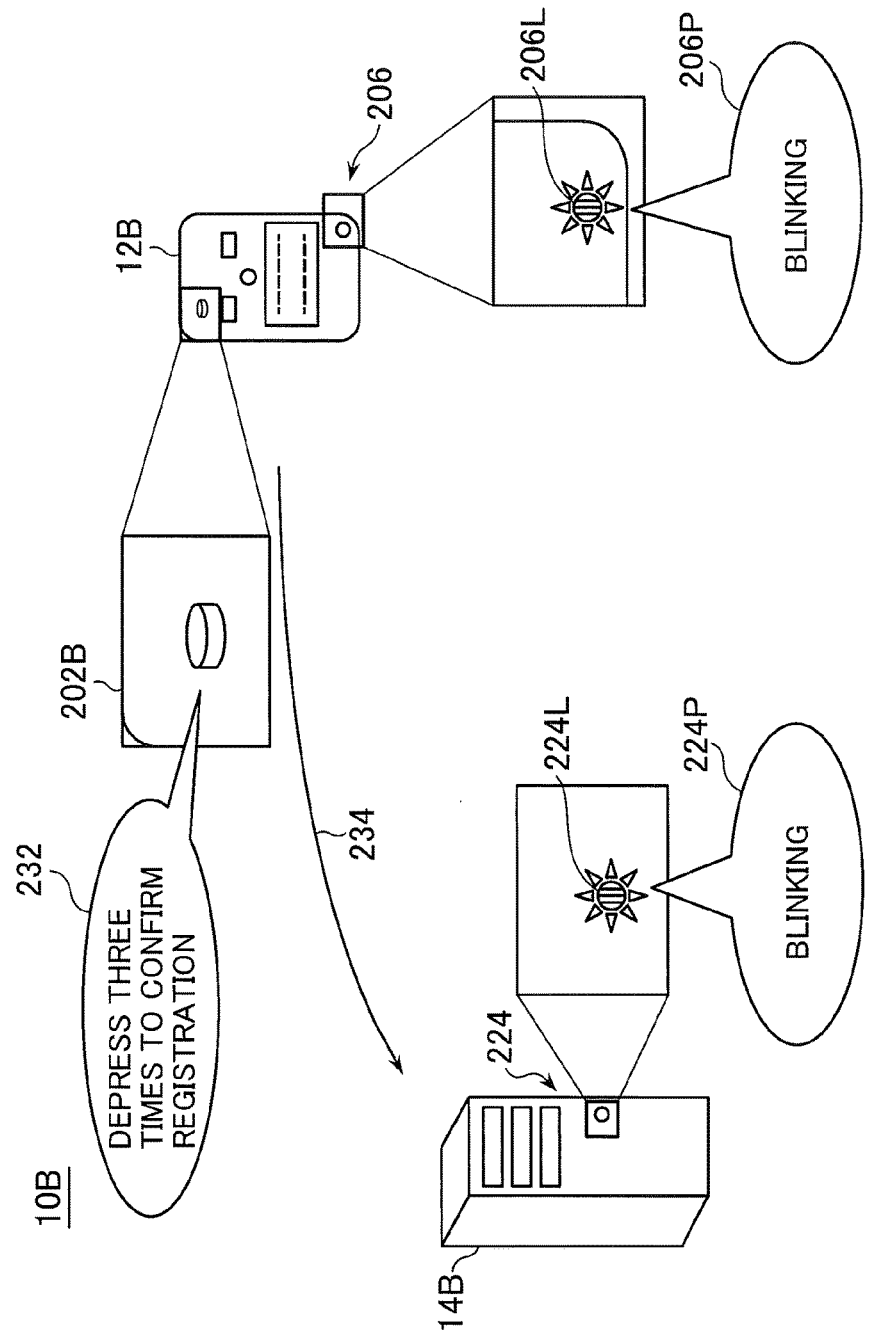

NETWORK REGISTRATION SYSTEM FOR REGISTERING COMMUNICATOR ON NETWORK AND NETWORK DEVICE THEREFOR

BACKGROUND OF THE INVENTION

Field of the Invention

The present invention relates to a network registration system and a network device, and more particularly to such a system and a device allowing, for example, the user intending to register a communicator provided with a simple human interface to easily register the communicator in a wireless network without using other information technology (IT) equipment such as a personal computer.

Description of the Background Art

In recent years, radio communicators connectable to telecommunications networks, such as a mobile phone network and a public wireless network, are widely prevalent. Most of the present radio communicators, such as laptop computers and mobile phones, e.g. smartphones, include a graphical user interface. However, it is expected that communicators, such as wireless sensor devices, provided with a simple human interface may in the future be widely prevalent. For example, such communicators may be communicators having wireless function built in and provided with simple buttons and/or indicator lamps.

In order to initially make such a radio communicator join or participate in a wireless network, it may be necessary to register the identification of the radio communicator and/or authentication information for authenticating the radio communicator to an access point or an authentication server in the wireless network. Furthermore, it may be also necessary to register on the radio communicator the identification of the wireless network and authentication information for allowing the radio communicator to join the wireless network.

However, such registering operations may be complicated for general users not familiar with IT equipment and networks. In order to widely spread radio communicators into ordinary household, it is necessary to implement radio communicators allowing the user to simply conduct initial connection configuration on a network.

As a solution for the above-mentioned problem, U.S. Pat. No. 8,205,073 to Ishidoshiro teaches a method in which only depressing buttons provided on an access point and a terminal to be joined in a network causes information on initial network configuration to be transmitted between the access point and the terminal, thereby facilitating network registration.

In the method disclosed by Ishidoshiro, a registration request from a new terminal is acceptable only within a predetermined period of time following the depression on a button of an access point to thereby eliminate unauthorized registration conducted by a third-party terminal. That is to say, the predetermined period of time may be of a restrictively acceptable mode in which initial registration can be accepted. In the method, upon blinking/lighting of an indicator lamp included in an access point, the user may be aware of a current communication mode, the restrictively acceptable mode in which initial registration is permitted or a wireless communication mode in normal operation. The user can thereby recognize completion of the initial network configuration.

In contrast, if it happens, after having depressed the button of the access point, to receive a registration request only from a third-party terminal within the predetermined period of time, the access point may inappropriately register that third-party terminal. In this case, the user has to detect the incorrect registration by, e.g. inspecting a list of participating terminals or the like and then eliminate the inappropriately registered third-party terminal.

However, in a wireless mesh network which is expected to spread in recent years, ex post facto elimination of a incorrectly registered third-party terminal would be difficult.

Different from networks, such as a wireless local area network (LAN) widely prevalent at the moment, in which an access point and a terminal communicate in peer to peer fashion, the wireless mesh network is a telecommunications network in which a communicator establishes communication links with appropriate, adjacent nodes to thereby autonomously set up an optimal communication path or route. Thus in general, communicators forming the wireless mesh network have authentication information common to the network set up so as to enable, at any time, communication links to be established with appropriate, adjacent nodes. In the conventional type of networks with peer-to-peer communication, incorrect registration may be overcome by simply disabling the incorrect peer-to-peer link, so that the incorrect registration may have little influence on other terminals. However, in wireless mesh networks, incorrect registration leads to authentication information common to the network leaking to the third-party terminal which has incorrectly been connected, so that the incorrect registration may heavily damage other terminals. In that case, it would be required, for example, to update the authentication information on all the authorized terminals forming the network.

SUMMARY OF THE INVENTION

It is therefore an object of the present invention to provide a network registration system and a network device capable of preventing an incorrect registration while easily registering a communicator to a network.

In accordance with the present invention, a network registration system includes a communicator to be registered on a network and a register for registering the communicator on the network. Either one of the communicator and the register includes a first check information generator for generating a first check information signal according to check information for prompting the user to check that the communicator is treated as an object to be registered in the network registration system; and a first check information output section for outputting the first check information signal in a form sensible to the user. Furthermore, the other of the communicator and the register includes an evaluation criterion supplier for supplying evaluation criterion information allowing the user to evaluate the suitability of the check information emitted from the first check information output section.

Also in accordance with the present invention, a network device for use in a network registration system includes a communicator to be registered on a network and a register for registering the communicator on the network, the network device being either one of the communicator and the register. The network device includes a check information generator for generating a check information signal according to check information for prompting the user to check that the communicator is treated as an object to be registered in the network registration system; and a check information output section for outputting the check information signal in a form sensible to the user.

Also in accordance with the present invention, a network device for use in a network registration system includes a communicator to be registered on a network and a register for registering the communicator on the network, the network device being either one of the communicator and the register. The network device includes an evaluation criterion supplier for supplying evaluation criterion information for allowing the user to evaluate the suitability of check information transmitted from another network device cooperatively executing registration processing.

According to the present invention, it is possible to prevent an incorrect registration while easily registering a communicator to a telecommunications network.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which:

FIG. 10 explanatorily shows, like FIG. 4, how to prompt the user to check that the communicator is registered in the network registration system of the further alternative embodiment.

DESCRIPTION OF THE PREFERRED EMBODIMENTS

Illustrative embodiments of a network registration system according to the present invention will be described with reference to the accompanying drawings. The network registration systems of the illustrative embodiments can be applied to, for example, a registration of a radio terminal, or communicator, in a wireless mesh network.

Figure 1:
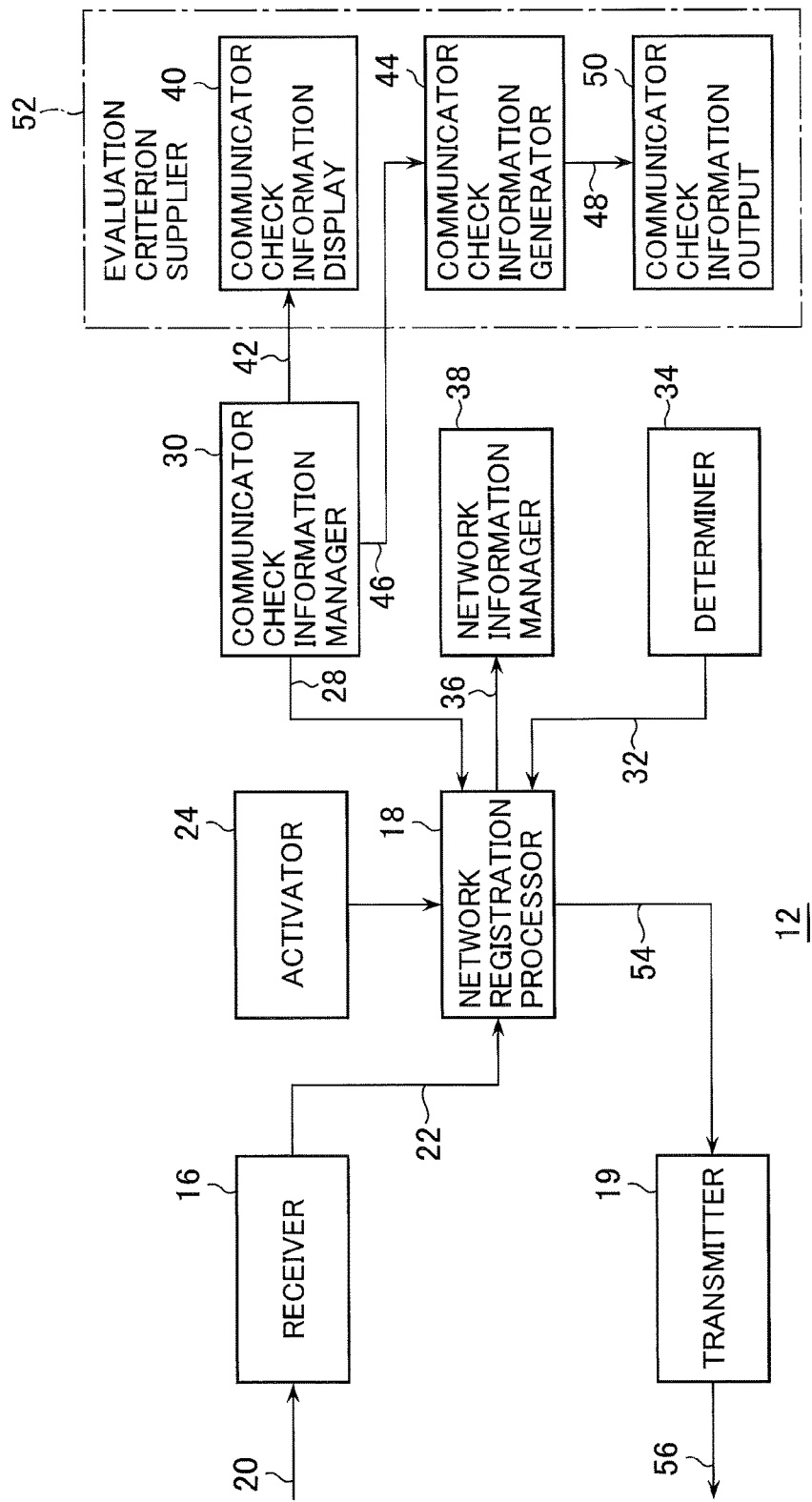
FIG. 1 is a schematic block diagram illustrating the internal configuration of a communicator included in an embodiment in accordance with the invention.

In the embodiment of the system shown in FIG. 1, a signal output from a register, such as an access point, in a wireless network is used to prompt the registrant to confirm a communicator to be registered on a wireless network.

Figure 2:
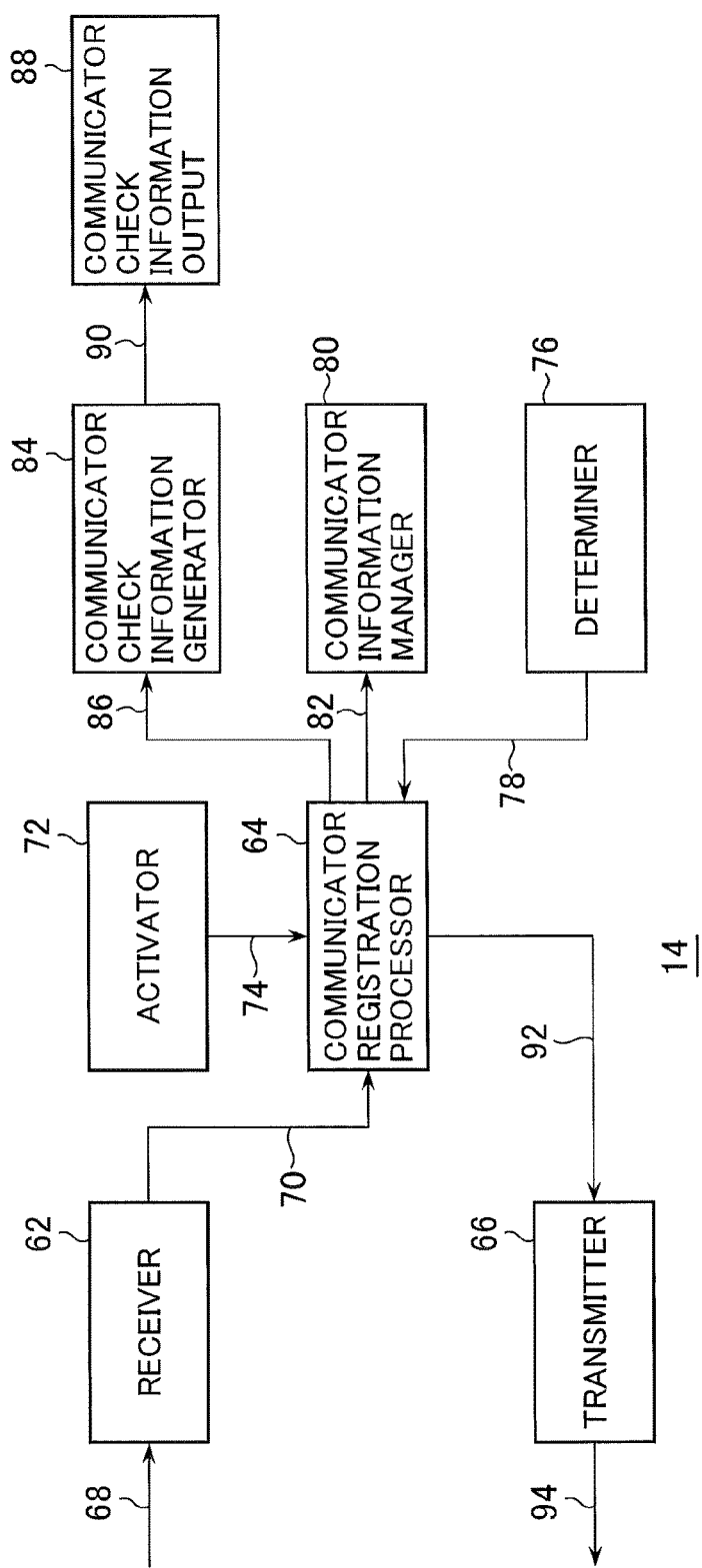
FIG. 2 is a substantially block diagram illustrating the internal configuration of a register included in the embodiment.

The network registration system 10 in the embodiment shown in FIG. 1 includes network devices for use in network communication, more specifically, a communicator 12 which may be an object to be registered, i.e. registration object, and a register 14 for registering the communicator 12 in the network. The communicator 12 and the register 14 in the embodiment are shown in FIGS. 1 and 2, respectively.

FIG. 1 is a schematic block diagram illustrating the internal configuration of the communicator 12 included in the system in the embodiment. The communicator 12 in the embodiment may include its internal elements implemented by hardware, or alternatively or additionally by a processor system including a central processing unit (CPU), a read only memory (ROM), a random access memory (RAM) and the like and adapted to execute program sequences so as to function as a communicator whereas some of the elements, such as transmitter and receiver, may at least partially be implemented in the form of hardware. Even in the latter case, the communicator 12 can be functionally represented by functional blocks as shown in FIG. 1.

The communicator 12 in the embodiment includes a receiver 16 for receiving information from the register 14, a network registration processor 18 for processing the information which the receiver 16 receives, and a transmitter 19 for transmitting the information processed in the network registration processor 18 to the register 14.

The receiver 16, which can receive information 20 on radio waves from the register 14 in the network, is connected by a communication line 22 to the network registration processor 18. The receiver 16 supplies the processor 18 with information received on the line 20 from the network on which the communicator 12 is to be registered.

The communicator 12 includes an activator 24 for activating or boosting an initial registration mode for newly setting up information on the wireless network which the communicator 12 is to join in. The activator 24 is connected by a communication line 26 with the network registration processor 18.

The activator 24 may not be adapted for activating the initial registration mode by a specific way. For example, the activator 24 may be adapted to determine that the initial registration mode is to be activated when the communicator 12 is powered on while in its factory-default state. Alternatively, the activator 24 may be adapted to determine that the initial registration mode is to be activated when the user depresses an activation button or key arranged on the communicator 12, or powers up the communicator 12 while depressing the activation button. The activator 24 supplies an activation message, which may be also called a processing start message, of the initial registration mode to the network registration processor 18.

The network registration processor 18 newly executes registration processing with the register 14 in the network to determine whether to register the network as a network allowed to join or participate in. In response to the activation message supplied from the activator 24, the network registration processor 18 initiates network registration processing. The network registration processing can be executed by, for example, transmitting an entry request to a neighboring network and receiving a response representative of entry acceptable or unacceptable from the neighboring network.

The network registration processing may include an authentication process conducted between the communicator 12 and the network register 14. In the embodiment, the authentication process may not be limited to a specific method. For example, the authentication process may use a common or public key encryption to perform an authentication and a key exchange.

The network registration processor 18 is connected by a communication line 28 to a communicator check information manager 30 for managing check information available for the user to identify a particular communicator 12. In the network registration processing in the above key system, the communicator 12 supplies the communicator check information received from the communicator check information manager 30 to the register 14 in the network through the transmitter 19. Furthermore, the communicator 12 receives information on the network, such as network identification data or the like, supplied from the register 14.

The network registration processor 18 may be adapted to, for example, receive a response of entry acceptable from the network and determine from the response that the communicator 12 may be registered in the network. In contrast, when a response of entry unacceptable is received or a response of entry acceptable is not received from the network, for example, the processor 18 suspends the registration processing for the network.

The network registration processor 18 is connected by a communication line 32 to a determiner 34 for determining the acceptance or refusal of the registration. The processor 18 may also be adapted for receiving a message of registration acceptable or unacceptable provided from the determiner 34, and determine from the message whether the registration is to be proceeded to or suspended.

The network registration processor 18 is connected by a communication line 36 to a network information manager 38 for managing information on the network which registers the join or entry of the communicator 12 into the network. The network registration processor 18 supplies the network information on the network which is determined to be registered to the network information manager 38. The network information may include, in addition to the network identification data, authentication information utilized for the authentication process at the time of joining again, or reentry, after registering the network information and other information. Upon receiving from the processor 18 network information on a network which the communicator 12 is permitted to join in, the network information manager 38 manages the network information.

The determiner 34 is adapted for determining whether or not the communicator 12 is to registered in the network which the communicator intends to newly participate in on the basis of the instructions from the user, for instance. The communicator 12 may include, for example, a registration execution button, not shown, so that the determiner 34 is responsive to the registration execution button being depressed by the user within a predetermined period to determine that the registration operation is to be proceeded to. In contrast, the determiner 34 may be adapted to determine that the registration operation is to be suspended or aborted if, for example, the user does not depress the registration execution button within the predetermined period. The communicator 12 may further include a registration halt button, not shown, so that the determiner 34 can determine that the registration operation is to be halted when the user depresses the registration halt button. The determiner 34 supplies a message of registration acceptable or unacceptable in response to the above operation to the network registration processor 18.

The check information managed by the communicator check information manager 30 may be, or contain, identification data such as a media access control (MAC) address by which the user can identify a particular communicator 12. The check information manager 30 supplies the check information managed therein to the network registration processor 18 on the line 28.

The communicator 12 includes a communicator check information display 40 connected by a communication line 42 to the communicator check information manager 30. The check information manager 30 can supply notification data managed therein to the communicator check information display 40 on the line 42. The display 40 can show or visualize notification data for use in informing the user that the communicator 12 has executed, or is executing, the registration processing. Notification data to be displayed may be an identification, such as a MAC address, by which the user can identify a particular communicator 12. Notification information to be shown on the display 40 may be information that can specify a signal carrying communicator check information. Notification information to be displayed may be, for example, a signal per se conveying communicator check information.

Such signals usable for communicator check information may not be limited to a specific type of signals. For example, in an application in which the user or registrant is informed by means of a lighting pattern of lamp that the communicator 12 has completed the registration processing, the communicator check information display 40 may present a notice "Lamp Flashes with Pattern 1", "Lamp Blinks", or "Lamp Blinks Five Times", for instance. Alternatively or additionally, in an application where the user is informed by means of an audible pattern, for example, the display 40 may present a notice "Sounding with Pattern 1", "Beeping", or "Announcing as 'Device No. 15'", for instance.

The communicator check information display 40 may be, for example, a label on the casing of the communicator 12 or a text read on an operating manual or the like attached to the communicator 12. If the communicator check information display 40 is of an electrical display having its input interface 42 interconnected to the communicator check information manager 30, the display 40 electrically displays communicator check information supplied from the manager 30, a signal conveying communicator check information, or information specifying a signal carrying communicator check information.

The communicator 12 includes a communicator check information generator 44 connected by a communication line 46 to the communicator check information manager 30. The communicator check information generator 44 generates information for notifying the user that the communicator 12 has executed, or is executing, the registration processing. The generator 44 is adapted to receive communicator check information supplied from the manager 30 to generate a signal which the user can identify that communicator 12. The generator 44 is further connected by a communication line 48 to a communicator check information output section 50 for outputting a signal for notifying the user that the communicator 12 has executed, or is executing, the registration processing.

The signal for identifying a communicator 12 may not be limited to a specific type of signals. For example, in an application causing the user to identify the communicator 12 by means of a lighting pattern of a lamp, a lighting pattern derivable from an identification, such as the MAC address of the communicator 12, can be applied as a signal for identifying the communicator 12. In this case, for example, sixteen lighting patterns represented by the least significant four bits of a MAC address may be defined in advance, and an output signal designating one of the lighting patterns may be supplied to the communicator check information output section 50.

Alternatively, for example, the value of a MAC address is divided by the number of lighting patterns to obtain a remainder, i.e. mod (MAC address value/lighting pattern number), and the communicator check information generator 44 may supply an output signal representative of a lighting pattern corresponding to the remainder to the communicator check information output section 50.

Alternatively or additionally to the lighting patterns of the lamp, a sound pattern may be used to render the user identify a particular communicator 12. In this case, for example, the least significant four bits in hexadecimal representation of a MAC address may be converted to audio data, which may in turn be supplied by the generator 44 to the output section 50 in the form of voice output signal. In a system in which the communicators 12 are classified into sixteen types according to the least significant four bits in hexadecimal representation of the MAC addresses thereof, the communicator check information output section 50 of a communicator can produce an audible sound, for example, "Device No. 15."

The communicator check information output section 50 is adapted to receive an output signal, in conformity with the output device included in the output section 50, supplied from the check information generator 44 to emit the output signal. The output signal may be representative of, for example, a lighting pattern of the lamp and/or a sound pattern or a voice, as described earlier. The output section 50 may include an input interface adapted to receive a signal defining an output timing of the sound, and may be operative in response to the output timing signal from the input interface to immediately produce a signal for specifying the communicator 12. For example, the output section 50 may be adapted to output a signal for specifying the communicator upon an output button provided with the communicator 12 being depressed.

The output device included in the output section 50 may be a visual output device such as a lamp and/or a compact liquid crystal display, and/or an auditory output device such as a buzzer or a loudspeaker.

As shown in FIG. 1, it can be considered that the display 40, the generator 44 and the output section 50 constitute an evaluation criterion supplier 52 for supplying evaluation criterion information which allows the user to evaluate the suitability of the check information emitted from the register 14. However, in a system in which some functional sections such as the network registration processor 18 and the communicator information manager 30 are configured to at least partially execute operations regarding the registration confirmation of the communicator 12, it can be also considered that those sections may be included in the evaluation criterion information supplier 52.

The transmitter 19 is connected by a communication line 54 to the processor 18. The transmitter 19 wirelessly, i.e. on radio waves, transmits signals 56 conveying information such as identification data supplied from the processor 18 in the network registration processing.

FIG. 2 is a schematic block diagram illustrating the internal configuration of the register 14 included in the system in the instant embodiment. The register 14 in the embodiment may be implemented by hardware, or alternatively or additionally by a processor system including a CPU, a ROM, a RAM and the like and adapted to execute program sequences so as to function as a register whereas some of the elements, such as transmitter and receiver, may at least partially be implemented in the form of hardware. Even in the latter case, the register 14 may functionally be represented by functional blocks as depicted in FIG. 2.

The register 14 in the embodiment includes a receiver 62 for receiving information from the communicator 12, a communicator registration processor 64 for processing the information which the receiver 62 receives, and a transmitter 66 for transmitting the information processed in the processor 64 to the communicator 12.

The receiver 62, which can wirelessly receive information 68 from the communicator 12 in the network, is connected by a communication line 70 to the communicator registration processor 64. The receiver 62 supplies information received from the communicator 12 that is to be registered to the processor 64 on the line 70.

The register 14 includes an activator 72 for activating an initial registration mode for allowing and configuring a new connection of the communicator 12. The activator 72 is connected by a communication line 74 to the communicator registration processor 64.

In the embodiment, it may not be limited to a specific way how to determine whether to boost the initial registration mode. For example, the activator 72 may be adapted to be responsive to an activation button, now shown, arranged on the register 14 being depressed to determine that the initial registration mode is to be activated. Alternatively, the activator 72 may be adapted to be operative in response to an activation signal being received for starting the initial registration mode from an external device to determine that the mode is to be activated. The activator 72 supplies an activation message, which can be also called a processing start message, of the initial registration mode to the communicator registration processor 64.

The communicator registration processor 64 is adapted to newly execute registration processing with the communicator 12 in the network to determine whether to register the communicator 12 as an acceptable communicator to join. The processor 64 executes the registration processing for the communicator 12 in response to an activation message supplied from the activator 72. The registration processing for the communicator 12 may be controlled such that, for example, the registration processing is executed within a predetermined period of time commencing from receiving the activation message and would not be executed after the time period being expired. The register 14 can include a registration cancel button adapted to terminate, when depressed, the registration processing of the communicator 12. In the registration processing of the communicator 12, for example, the register 14 receives an entry request from any of the communicators 12 and then transmits a response of entry acceptable or unacceptable to that communicator 12.

The communicator registration processing may include an authentication process between the communicator 12 and the register 14. The authentication process may not be limited to a specific way. For example, the authentication process may use a common or public key encryption to perform an authentication and a key exchange.

In the communicator registration processing, the register 14 can provide network information, such as an identification, through the transmitter 66 to the communicator 12. The register can receive identification data from the communicator 12 through the receiver 62.

The register 14 includes a determiner 76 connected by a communication line 78 to the communicator registration processor 64. The determiner 76 is adapted for determining whether or not the register 14 may register a communicator 12 having requested for registration as a new communicator allowed to participate in or enter the network. The processor 64 may be adapted to be responsive to a message of registration acceptable or unacceptable supplied from the determiner 76 being received to determine whether to execute a new registration of the communicator 12. When the communicator 12 is included in a blacklist, or when authentication is unsuccessful with the communicator 12, the processor 64 may determine a registration refusal without waiting for a message from the determiner 76.

The register 14 can include a registration execution button adapted to determine, when depressed, the execution of the registration processing of the communicator 12. In addition, the register 14 can include a registration halt button functioning to determine, when depressed, to suspend the registration processing of the communicator 12. The determiner 76 may be adapted, for example, to be responsive to the registration execution button not being depressed within the predetermined period of time or the registration halt button being depressed to determine that the registration is to be suspended. The determiner 76 may be adapted for receiving a signal of registration acceptable or unacceptable from an external device to determine that the registration is to be executed or suspended accordingly. In those cases, the determiner 76 delivers a message of registration acceptable or unacceptable to the processor 64.

The register 14 includes a communicator information manager 80, which is connected by a communication line 82 to the communicator registration processor 64, for managing information on the communicator 12 permitted to join by the register 14. The information on the communicator 12, which is determined to be registered, is supplied from the processor 64 to the communicator information manager 80. The information managed by the manager 80 may include, in addition to the identification such as the MAC address of the communicator 12, authentication information for use in the authentication process at the time of requesting for reentry from the communicator 12.

The register 14 includes a communicator check information generator 84, which is connected by a communication line 86 to the communicator registration processor 64, for generating check information such as an identification by which the register 14 allows the user to confirm the communicator 12 that is currently under registration processing. The processor 64 supplies the received identification of the communicator 12 over the line 86 to the communicator check information generator 84. The generator 84 receives the identification of the communicator 12 under registration processing from the processor 64 to generate a signal for rendering the user confirm that communicator 12.

The signal for causing the user to confirm the communicator 12 may not be limited to a specific type of signal. For example, in an application in which the user can identify or confirm the communicator 12 by a lighting pattern of a lamp, the register 14 may use the lighting pattern derivable from the identification such as the MAC address of the communicator 12. In this case, for example, sixteen lighting patterns corresponding to the least significant four bits of the MAC address may be defined in advance. The output signal designating a lighting pattern corresponding to the MAC address of the communicator 12 under registration processing may be supplied to a communicator check information output section 88 connected by a communication line 90 to the communicator check information generator 84.

Alternatively, for example, the value of the MAC address may be divided by the number of lighting patterns to obtain a remainder, and an output signal designating one of the lighting patterns that corresponds to the remainder may be supplied to the communicator check information output section 88.

The communicator 12 may be specified by a sound pattern, alternatively or additionally to the lighting pattern of the lamp. For example, the least significant four bits in hexadecimal representation of the MAC address may be converted to voice data. The generator 84 may supply a voice output signal to the communicator check information output section 88. In a system in which the communicators 12 are classified into 16 types according to the least significant four bits in hexadecimal representation of the MAC address thereof, the output section 88 can produce a vocal message, for example, "Device No. 15."

The communicator check information output section 88 emits a signal by which the register 14 enables the user to confirm the communicator 12 under registration processing. The output section 88 includes an output device, which may be a visual output device such as a lamp and/or a compact liquid crystal display, and/or an auditory output device such as a buzzer and a loudspeaker. The output section 88 receives an output signal, in conformity with the output device, supplied from the communicator check information generator 84 to emit the output signal. The signal may be representative of, for example, a lighting pattern of the lamp, a sound pattern or an audio signal.

The transmitter 66 is connected by a communication line 92 to the processor 64. The transmitter 66 wirelessly transmits information 94 such as an identification supplied from the communicator registration processor 64 in the network registration processing.

Figure 3:
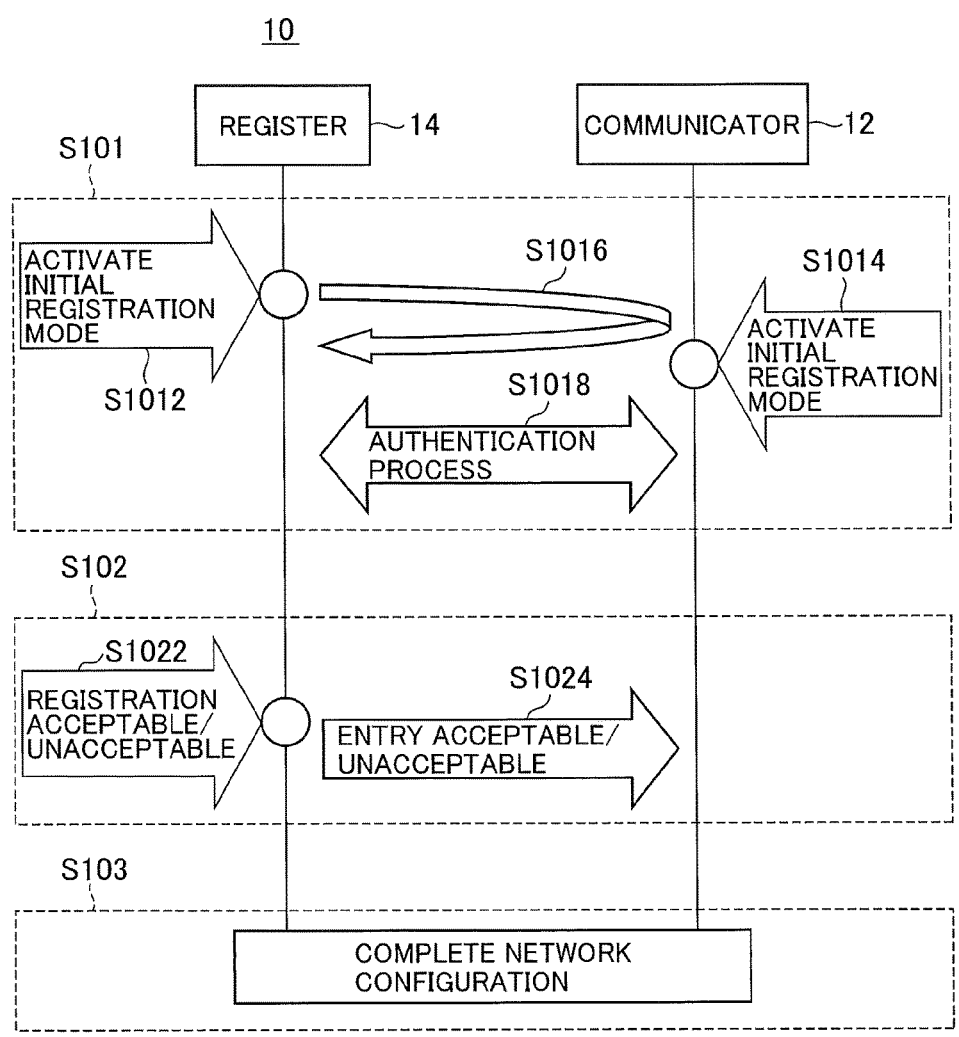
FIG. 3 is a sequential chart useful for understanding an operation performed in a network registration system of the embodiment.
Figure 4:
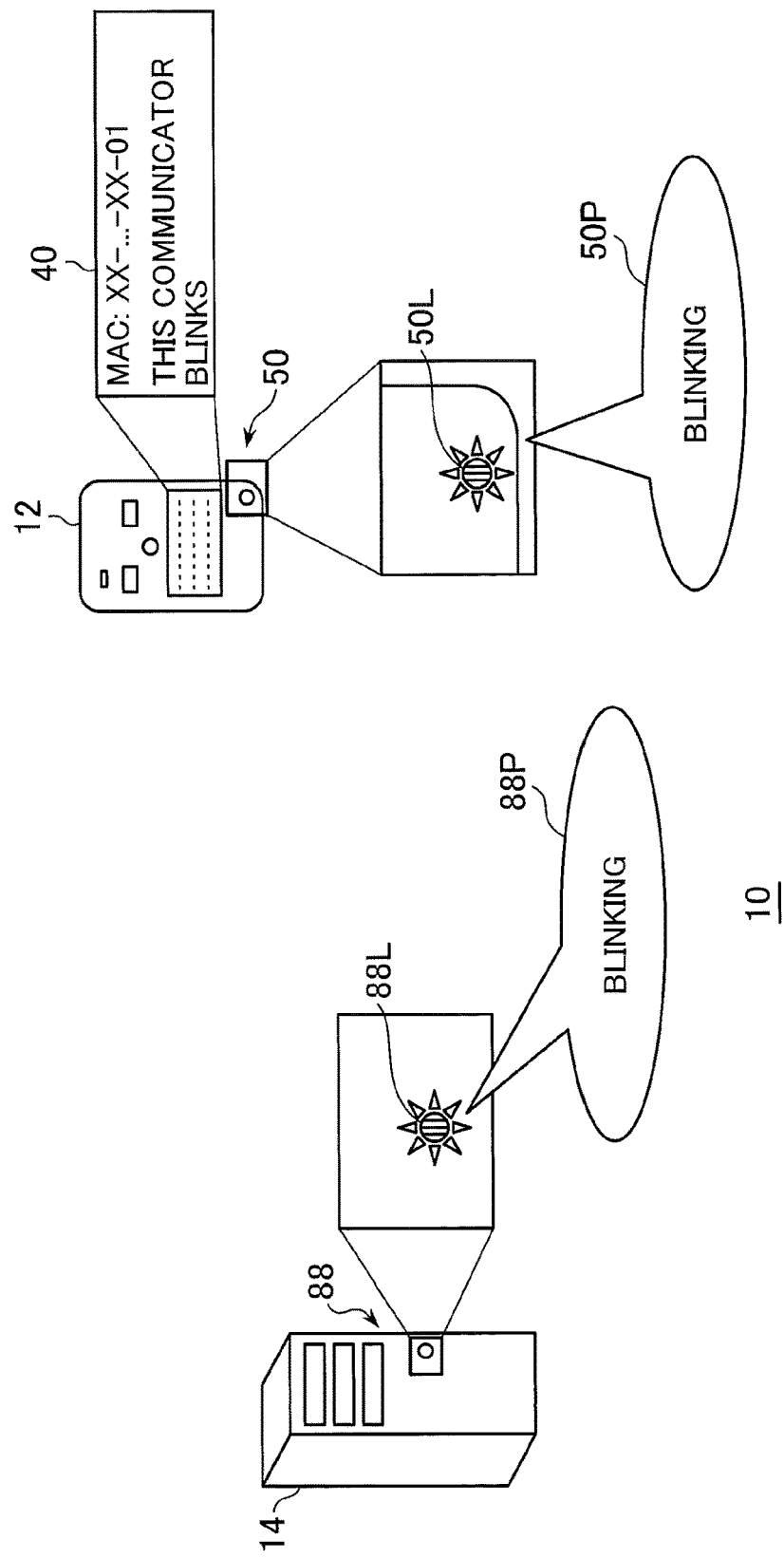
FIG. 4 explanatorily shows how to prompt the user to check that the communicator shown in FIG. 1 is registered in the network registration system.

Next, the operation of the network registration system 10 in the present embodiment will be described in detail with reference to FIGS. 3 and 4 showing the system 10 including the communicator 12 and the register 14.

FIG. 3 is a sequential chart illustrating the operation of the network registration system 10 in the illustrative embodiment. FIG. 4 explanatorily depicts how to prompt the user, or registrant, to check that the communicator 12 is registered in the network registration system 10 in the embodiment.

The operation of the network registration system 10 in the embodiment generally falls into three operations; an activation operation of the initial registration mode S101, a registration check operation S102, and a network connection setting operation S103.

The activator 72 in the register 14 determines that the initial registration mode is to be activated and starts this mode (step S1012). Also, the activator 24 in the communicator 12 determines that the initial registration mode is to be activated and starts this mode (step S1014).

The network registration processor 18 in the communicator 12 and the communicator registration processor 64 in the register 14 transmit and receive communicator check information data such as the MAC address of the communicator 12 and network information such as the network identification therebetween (step S1016).

In this process, an authentication process may be performed between the communicator 12 and the register 14 (step S1018). In this case, unsuccessful authentication leads to halting the registration processing.

The communicator check information generator 84 in the register 14 generates information for allowing the user to identify or confirm the communicator 12 under registration processing, and outputs a signal carrying the generated information to the communicator check information output section 88. For example, the output section 88 can include, as shown in FIG. 4, an indicator lamp 88L, which can be also called a "check lamp", as an output device, the lamp 88L emitting light in a lighting pattern 88P driven by the output signal. Thus, the user may be aware of the lighting pattern indicating the communicator 12 currently under registration processing from the communicator check information output section 88 in the register 14.

As shown in FIG. 4, the communicator 12 under registration processing may also include the communicator check information output section 50 to output substantially the same signal as the signal supplied to the output section 88 in the register 14. The output section 50 can include an indicator lamp 50L, which can be also called a "check lamp", as an output device to blink at substantially the same lighting pattern 50P as the above-mentioned lighting pattern 88P. For example, in an application where the communicator 12 has its surface partially labeled with the communicator check information display 40 as described earlier, the label carries, as shown in FIG. 4, indications of the MAC address of the communicator 12 and a direction of the lighting pattern 50P blinking when having registered.

The determiner 76 in the register 14 generates a message indicating "registration acceptable" or "registration unacceptable" for the communicator 12 under registration processing to supply the message to the communicator registration processor 64 (step S1022). The registration may be determined acceptable if, for example, the signal delivered to the communicator check information output section 88 in the register 14 corresponds to the information displayed on the communicator check information display 40 in the communicator 12 currently under registration processing, and otherwise determined unacceptable. When the signal corresponds to the information displayed on the display 40, the processor 64 determines that the registration process should be proceeded to. In contrast, when the signal does not correspond to the information displayed on the display 40, the processor 64 determines that the registration process should be aborted.

The communicator registration processor 64 in the register 14 generates a response message "entry acceptable" or "entry unacceptable" according to the determination of registration acceptable or unacceptable, respectively, to transmit the response message through the transmitter 66 to the communicator 12 (step S1024).

For example, the determiner 76 may include a registration execution button and/or a registration halt button. The user references the indication on the communicator check information to thereby check whether or not the lighting pattern indicated on the communicator 12 under registration processing matches the lighting pattern of the intended communicator 12. The user depresses the registration execution button or the registration halt button according to his/her confirmatory result. Depending on the button depressed by the user, the determiner 76 may generate the message "registration acceptable" or "registration unacceptable" for the communicator 12 under registration processing.

The network registration processor 18 in the communicator 12 receives the response message of entry acceptable or unacceptable from the register 14. The processor 18 further determines whether or not the communicator 12 can be registered in the network currently under registration processing. The processor 18 may be adapted for receiving the message of registration acceptable or registration unacceptable from the determiner 34 to determine that the registration in the register 14 has executed or halted.

The communicator information manager 80 in the register 14 manages the information on the newly registered communicator 12. The information may include authentication information for use in the authentication process at the time of joining in the network again after the communicator registration, in addition to information for identifying the communicator such as a MAC address.

The network information manager 38 in the communicator 12 manages information on the network in which the communicator has newly been registered. The network information manager 38 also manages authentication information for use in the authentication process at the time of reentering the network after the network information registration, in addition to the identification of the network.

When the information on the newly registered communicator 12 and the newly registered network is correctly managed in the communicator information manager 80 and the network information manager 38, respectively, the network connection setting operation performed by the network registration system 10 is completed (step S103).

In summary, according to the instant embodiment, the information for checking the communicator 12 displayed on the communicator 12 under registration processing is compared with the signal delivered from the register 14 in the wireless network, as shown in FIG. 4, whereby it is possible to check whether or not the communicator 12 which intends to register to a network is actually going to be registered on the wireless network intended by the registrant.

For example, even when registering on a wireless network a communicator 12 provided with a simple human interface, such as a communicator having wireless function built in and provided with a button, an indication lamp or the like, it is possible to prevent an incorrect registration without utilizing sophisticated IT equipment such as a personal computer by the registrant.

Next, an alternative embodiment of a network registration system according to the present invention will be described with reference to FIGS. 5, 6 and 7. The network registration system 10A of the alternative embodiment can be also applied to, for example, a registration of a radio terminal, communicator, in a wireless mesh network, as is the case with the previous embodiment.

In the alternative embodiment of the system, a signal output from a communicator intended to join in a wireless network is used to notify the registrant of a register of the wireless network in which the communicator is intended to register.

Figure 5:
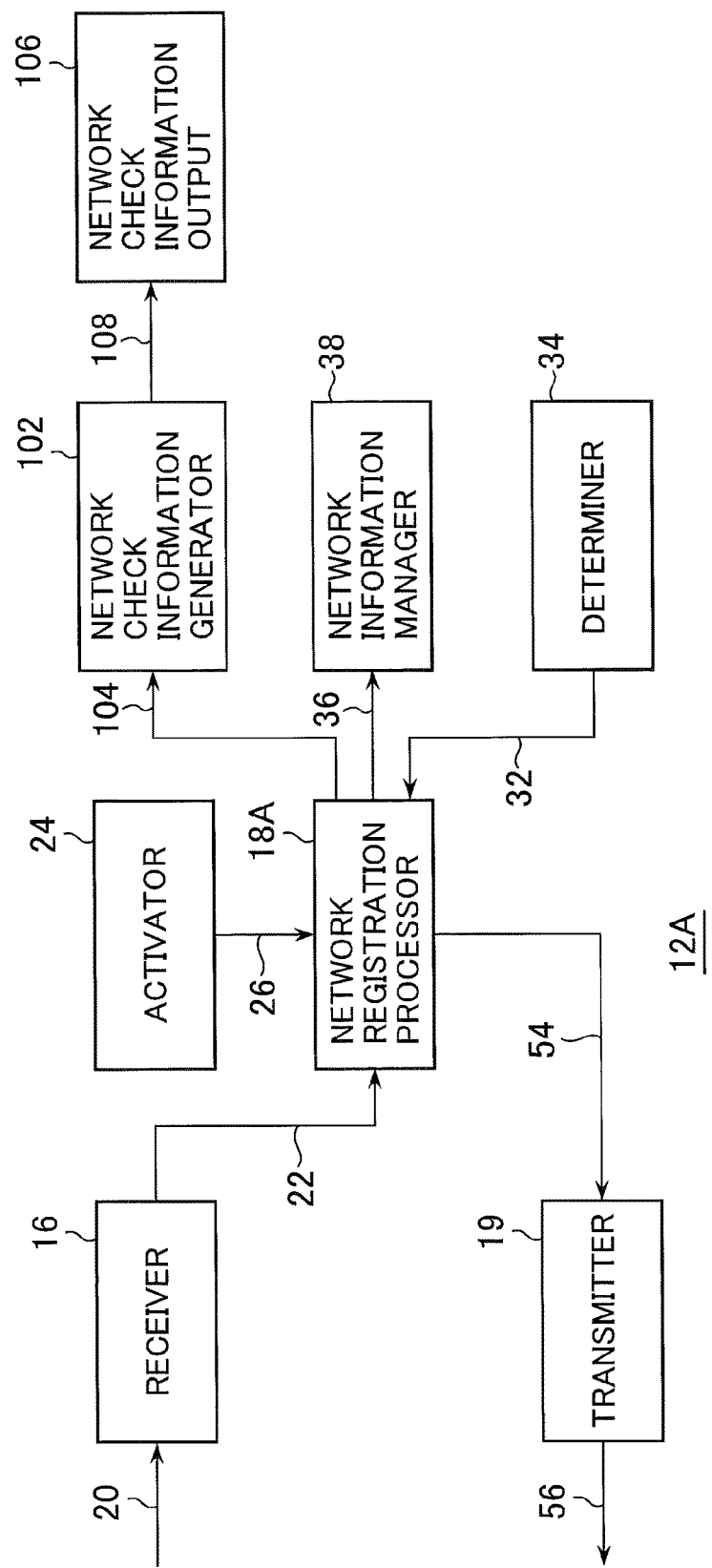
FIG. 5 is a schematic block diagram, like FIG. 1, illustrating the internal configuration of a communicator included in an alternative embodiment.
Figure 6:
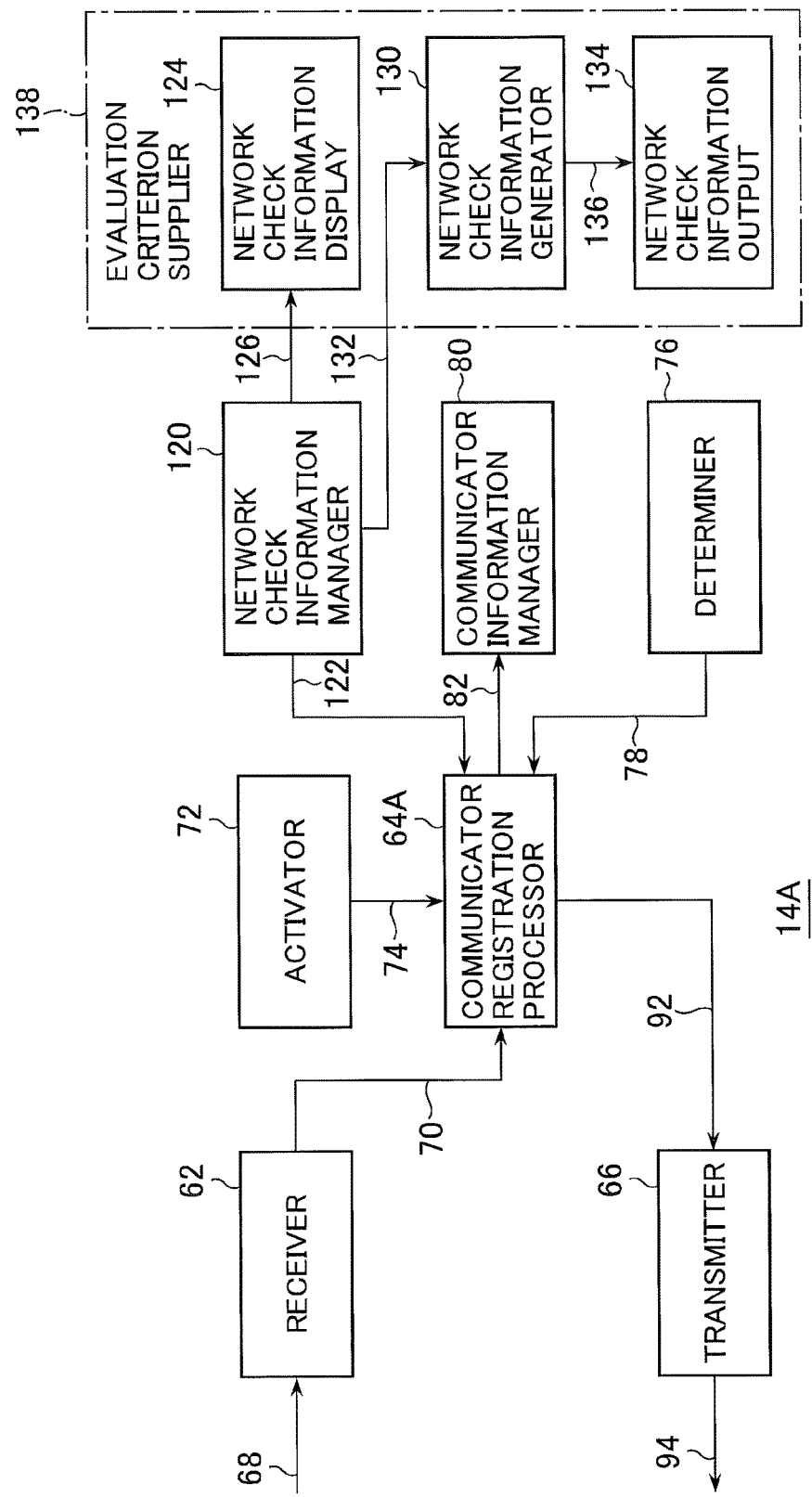
FIG. 6 is a schematic block diagram, like FIG. 2, illustrating the internal configuration of a register included in the alternative embodiment.
Figure 7:
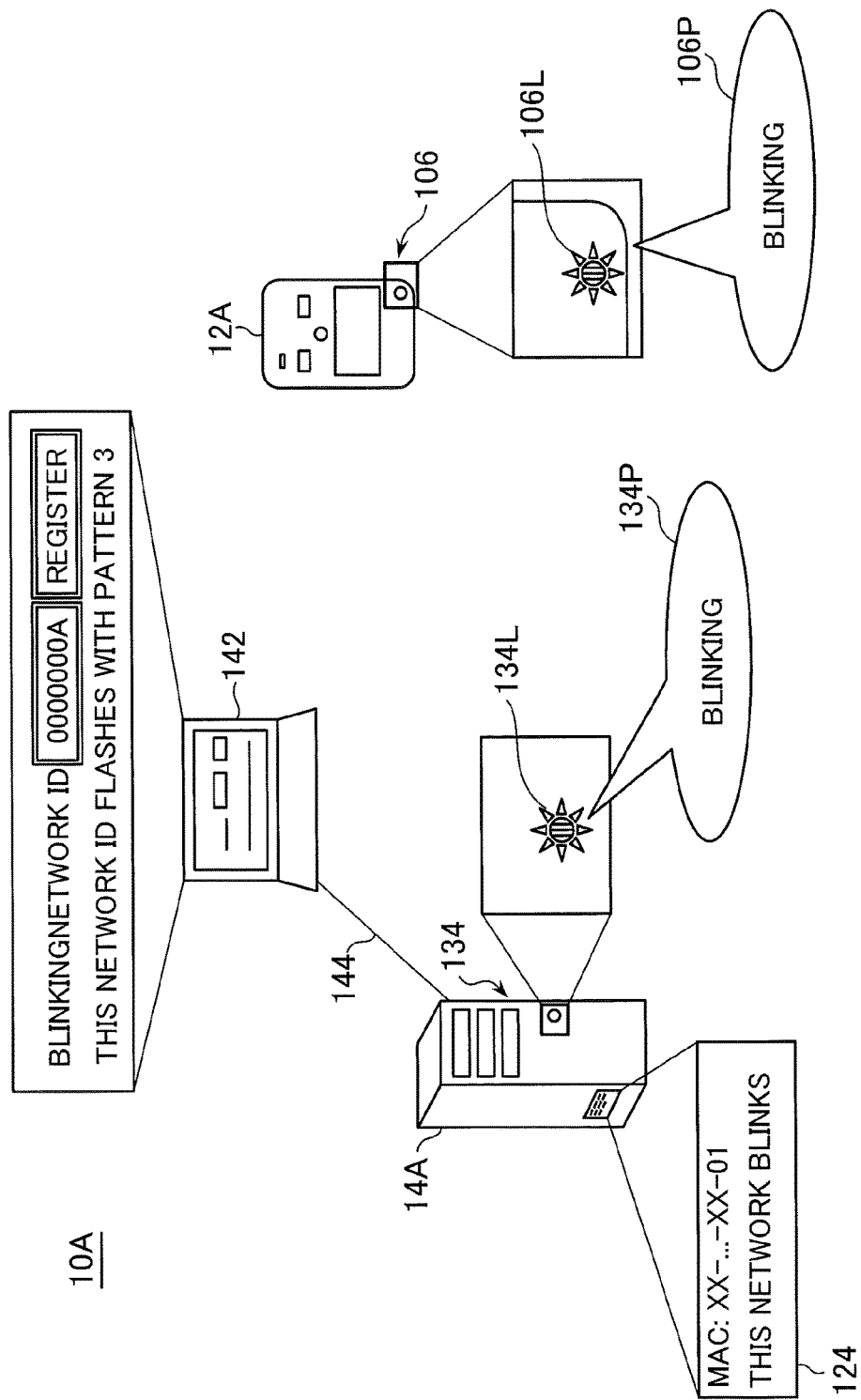
FIG. 7 explanatorily shows, like FIG. 4, how to prompt the user to check that the communicator is registered in the network registration system of the alternative embodiment.

As shown in FIGS. 5, 6 and 7, a network registration system 10A in the alternative embodiment includes a communicator 12A, which may be an object to be registered, and a register 14A for registering the communicator 12A.

FIG. 5 is a schematic block diagram illustrating the internal configuration of the communicator 12A in the system in the alternative embodiment. Some constituent elements in the communicator 12A may be similar to those in the communicator 12 in the previous embodiment shown in FIG. 1. Thus, throughout the present disclosure, like components are designated with the same reference numerals, and repetitive description thereon may be avoided for simplicity.

The communicator 12A may be implemented by hardware, or alternatively or additionally by a processor system including a CPU, a ROM, a RAM and the like and adapted to execute program sequences so as to function as a communicator whereas some of the elements, such as transmitter and receiver, may at least partially be implemented in the form of hardware. Even in the latter case, the communicator 12A can be functionally represented by functional blocks as shown in FIG. 5.

The communicator 12A in the embodiment includes the receiver 16 for receiving information from the register 14A, a network registration processor 18A for processing the information which the receiver 16 receives, and the transmitter 19 for transmitting the information processed in the processor 18A to the register 14A.

As is the case with the communicator 12 in the previous embodiment, the communicator 12A includes the activator 24, the determiner 34 and the network information manager 38, which are respectively connected to the processor 18A.

The communicator 12A further includes a network check information generator 102, which generates identification data for prompting the user to recognize that the network has executed, or is executing, the registration processing. The network check information generator 102 is connected by a communication line 104 to the network registration processor 18A to receive network information from the processor 18A.

The communicator 12A further includes a network check information output section 106, which outputs a signal for prompting the user to recognize that the network has executed, or is executing, the registration processing. The output section 106 is connected by a communication line 108 to the network check information generator 102 to receive the information generated by the generator 102.

Internal sections of the communicator 12A which are different from those of the communicator 12 in the previous embodiment will be described in detail in terms of the structure and functions. The network registration processor 18A may fundamentally be similar in structure and function to the processor 18 in the previous embodiment. However, the processor 18A may be different from the processor of the previous embodiment in that the processor 18A supplies network information received from the register 14A to the network check information generator 102 on the line 104. The network information may be, for example, a network identification assigned to the network or an identification of the register 14A, such as its MAC address, located on the network.

The network check information generator 102 receives the network information from the network registration processor 18A to generate a signal by which the user identifies the network.

The signal for identifying the network may not be limited to a specific type of signals. For example, in an application in which the user can identify or confirm the network by a lighting pattern of a lamp, a signal for use in identifying the network by the user may be a lighting pattern derivable from an identification such as the MAC address of the register 14A and a network identification. When referring to the MAC address, for example, sixteen lighting patterns corresponding to the least significant four bits of the MAC address may be defined in advance. The output signal designating one of the lighting patterns may be supplied to the network check information output section 106.

Alternatively, for example, the value of a MAC address is divided by the number of lighting patterns to obtain a remainder, i.e. mod (MAC address value/lighting pattern number), and the network check information generator 102 may supply an output signal representing a lighting pattern corresponding to the remainder to the network check information output section 106.

Alternatively or additionally to the lighting pattern of the lamp, a sound pattern may be used to render the user identify the communicator 12A. In this case, for example, the least significant four bits in hexadecimal representation of a MAC address may be converted to audio data. The network check information generator 102 may supply a voice output signal to the network check information output section 106. In a system in which the communicators 1A are classified into 16 types according to the least significant four bits in hexadecimal representation of the MAC address thereof, the output section 106 can produce a vocal message, for example, "Device No. 15."

The network check information output section 106 is adapted to receive an output signal, in conformity with the output device, such as a lamp, a buzzer or the like, included in the output section 106, from the network check information generator 102. The output section 106 further outputs a signal for notifying the user of the execution of the registration processing in the network. The signal may be, for example, a lighting pattern of a lamp, and/or a sound pattern or an audio signal.

FIG. 6 is a schematic block diagram illustrating the internal configuration of the register 14A included in the registration network system in the alternative embodiment. Again, the register 14A may be implemented by hardware, or alternatively or additionally by a processor system including a CPU, a ROM, a RAM and the like and adapted to execute program sequences so as to function as a register whereas some of the elements, such as transmitter and receiver, may at least partially be implemented in the form of hardware. Even in the latter case, the register 14A may functionally be represented by functional blocks as depicted in FIG. 6.

Some constituent elements in the register 14A may be similar to those in the register 14 in the previous embodiment shown in FIG. 2.

As shown in FIG. 6, the register 14A in the embodiment includes the receiver 62 for receiving information from the communicator 12A, a communicator registration processor 64A for processing the information which the receiver 62 receives, and the transmitter 66 for transmitting the information processed in the processor 64A to the communicator 12A. As is the case with the register 14 in the previous embodiment, the register 14A includes the activator 72, the determiner 76 and the communicator information manager 80, which are connected to the processor 64A.

Internal sections of the register 14A which are different in structure and function from the register 14 in the previous embodiment will be described in detail. The register 14A includes a network check information manager 120 for managing information for use in identifying a network. The network check information manager 120 is connected by a communication line 122 to the communicator registration processor 64A.

The communicator registration processor 64A may fundamentally be similar in structure and function to the processor 64 in the previous embodiment. However, the processor 64A may be different from the processor in the previous embodiment in that the processor 64A supplies information on the network provided from the network check information manager 120 through the transmitter 66 to the communicator 12A. The information on the network may include a network identification assigned to the network and the identification of the register 14A, such as the MAC address or the like, located on the network. The processor 64A receives the managed network information managed in the manager 120 on the line 122.

The register 14A includes a network check information display 124 for displaying check information for notifying the user that the network has executed, or is executing, the registration processing. The display 124 can include an input interface 126 for receiving information from the network check information manager 120. In this case, the manager 120 can give the network check information managed therein to the display 124.

The network check information to be shown on the network check information display 124 may be, for example, a network identification assigned to the network or on the register 14A, such as the MAC address thereof, located on the network. The network check information is displayed on the display 124 in order to inform the user that the registration processing is performed in the network.

Alternatively, as the network check information to be displayed and output, information specifying a signal conveying network check information may be applied, for example. As the network check information to be displayed on the display 124, a signal per se carrying the network check information may be applied.

Such signals usable for check information of the network may not be limited to a specific type of signals. For example, in an application in which the user is notified that the register 14 in the network has executed, or is executing, the registration processing by a lighting pattern of a lamp, the network check information display 124 may present a notice "Lamp Flashes with Pattern 1", "Lapp Blinks", "Lamp Blinks Five Times" or the like. Alternatively or additionally, in an application in which the user is notified of the execution by a sound pattern, for example, the display 124 may present a notice "Sounding with Pattern 1", "Beeping", or "Announcing as 'Device No. 15'", for instance.

The network check information display 124 may be, for example, a label on the casing of the register 14A, or a text read on an operating manual or the like attached to the register 14A. If the display 124 is of an electrical display provided with an input interface 126 interconnected to the network check information manager 120, the display 124 electrically displays network check information supplied from the network manager 120, a signal carrying network check information, or information specifying a signal carrying network check information. For example, the display 124 may be a display window of a network servicing screen accessible through a browser.

The register 14A includes a network check information generator 130 for generating information notifying the user that the network has executed, or is executing, the registration processing. The generator 130 is connected by a communication line 132 to the network check information manager 120. The generator 130 receives the network check information from the manager 120 to generate a signal by which the user can identify the network.

The signal for identifying a network may not be limited to a specific kind of signals. For example, in an application in which the user identifies or confirms the network by a lighting pattern of a lamp, the lighting pattern derivable from an identification such as the MAC address of the register 14A and/or a network identification, can be applied as a signal for identifying the network. In this case, sixteen lighting patterns may be defined in advance which correspond to the least significant several digits of an identification, e.g. the least significant four bits when the identification data is a MAC address, or a letter in the least significant position when an identification is formed by a string of letters. In turn, the network check information generator 130 may deliver an output signal designating one of the lighting patterns to a network check information output section 134 for outputting a signal by which the registrant can recognize the network has executed, or is executing, the registration processing. The network output section 134 may be connected by a communication line 136 to the network generator 130.

Alternatively, for example, the value of an evaluated value of an identification is divided by the number of lighting patterns to obtain a remainder, i.e. mod (identification value/lighting pattern number), and an output signal designating a lighting pattern representative of the remainder may be provided to the network check information output section 134.

Alternatively or additionally to the lighting patterns of the lamp, a sound pattern may be used to identify or confirm a network. For example, data in the least significant position or positions of an identification may be converted to voice data. The network check information generator 130 may supply a voice output signal to the network check information output section 134. In a system in which the least significant several positions of an identification are classified into 16 types, the output section 134 can produce a vocal message, for example, "Device No. 15."

The network check information output section 134 receives from the network check information generator 130 an output signal, in conformity with an output device included in the output section 134, to output the received signal through the output device. The signal may be, for example, a lighting pattern of a lamp, a sound pattern or a voice, depending on the sort of output device.

The network check information output section 134 may include an input interface adapted to receive a signal defining an output timing of the sound. In this case, the output section 134 emits a signal for a network check immediately after having received the signal of output timing. For example, the output section 134 emits a signal for network check upon an output button arranged in the register 14A being depressed.

As shown in FIG. 6, it can be considered that the display 124, the generator 130 and the output section 134 constitute an evaluation criterion supplier 138 for supplying evaluation criterion information which allows the user to evaluate the suitability of the check information emitted from the communicator 12A. However, in a system in which those sections are configured to at least partially execute operations regarding the registration confirmation of the network, it can be also considered that the evaluation criterion information supplier 138 may include internal sections such as the communicator registration processor 64 and the network check information manager 120.

Next, the operation of the network registration system 10 in the alternative embodiment will be described in detail with reference to FIGS. 3 and 7 showing the system 10A including the communicator 12A and the register 14A.

FIG. 7 explanatorily shows how to prompt the user, or registrant, to check that the communicator 12A is registered in the network registration system 10A. The operation of the network registration system 10A in the alternative embodiment may generally be similar to that in the previous embodiment. Thus, the operation in the alternative embodiment will be described with reference to FIG. 3 as well as FIG. 7.

The general operation of the network registration system 10A in the embodiment falls into three operations as with the previous embodiment. More specifically, the three operations are an activation operation of the initial registration mode S101, a registration check operation S102, and a network connection configuration operation step S103, as shown in FIG. 3. The activation operation of the initial registration mode S101) and the network connection configuration operation S103 may generally be similar to those in the previous embodiment described earlier. Therefore, the registration check operation S102 will be specifically described with reference to FIG. 7 since the registration check operation may be somewhat different from the operation performed in the previous embodiment.

The network check information generator 102 in the communicator 12A generates information, or a notification, for prompting the user to confirm the network under registration operation. The generator 102 supplies the generated signal to the network check information output section 106. For example, the output signal is a lighting pattern 106P of an indicator lamp, which can be also called "check lamp", 106L as shown in FIG. 7. The lighting pattern corresponding to the network under registration processing is notified to the user through the output section 106 in the communicator 12A.

The network check information output section 134 in the register 14A can output a signal similar to the signal supplied to the output section 106 in the communicator 12A. FIG. 7 illustrates this case. The output section 134 in the alternative embodiment includes an indicator lamp 134L, which is also called "check lamp". The indicator lamp 134L in the embodiment blinks with the lighting pattern 134P in synchronism with the above-mentioned lighting pattern 106P. For example, a label serving as the network check information display 124 may adhere to one surface of the register 14A. The label can show the MAC address of the register 14A as a network identification and a direction of the lighting pattern 134P blinking at the time of registration, as shown in FIG. 7.

In a system in which the register 14A is connected to a maintenance terminal 142 by a cable 144, an identification may be notified via a display screen or the like on the maintenance terminal 142, instead of, or in addition to, the notification operation of an identification for prompting the user to confirm the network in the register 14A. In FIG. 7, the display screen on the maintenance terminal 142 displays a network identification (ID) of the network containing the register 14A, and an identification pattern corresponding to the network ID.

The determiner 76 in the register 14A generates a message indicating "registration acceptable" or "registration unacceptable" for the communicator 12A under registration processing to deliver the message to the communicator registration processor 64A. The registration may be determined acceptable if, for example, the signal output to the network check information output section 106 in the communicator 12A corresponds to the information displayed on the network check information display 124 in the register 14A currently under registration processing. The processor 64A in the register 14A generates a response message "entry acceptable" or "entry unacceptable" to transmit the response message to the communicator 12A through the transmitter 66.

The network registration processor 18 in the communicator 12A receives the response message "entry acceptable" or "entry unacceptable" to determine whether or not the communicator 12A has registered, or is to be registered, to the network currently under registration processing. The processor 18 may, upon receiving the message "registration acceptable" or "registration unacceptable" supplied from the determiner 34, determine that the registration is executed or halted, accordingly.

In short, according to the alternative embodiment, information for checking the network displayed on the register 14A in a wireless network on which the registration processing is proceeded to is compared with a signal output from the communicator 12A under registration processing, as seen from FIG. 7. It is thereby possible to check whether or not the communicator 12A is actually going to be registered on the wireless network intended by the user.

Thus, even when registering to a wireless network the communicator 12A provided with a simple human interface, such as a communicator having wireless function built in and including a button, an indication lamp or the like, it is possible to simply prevent an incorrect registration without utilizing IT equipment such as a personal computer by the user.

Well, a further alternative embodiment of a network registration system according to the present invention will be described with reference to FIGS. 8, 9 and 10. The network registration system of the further alternative embodiment can be applied to, for example, a registration of a radio terminal, communicator, in a wireless mesh network, as is the case with the previous embodiments.

In the further alternative embodiment, the registrant uses a signal depending on specific information shared by a register and a communicator in the wireless network during registration processing to confirm that the registration processing is just being executed between the communicator and the wireless network.

Figure 8:
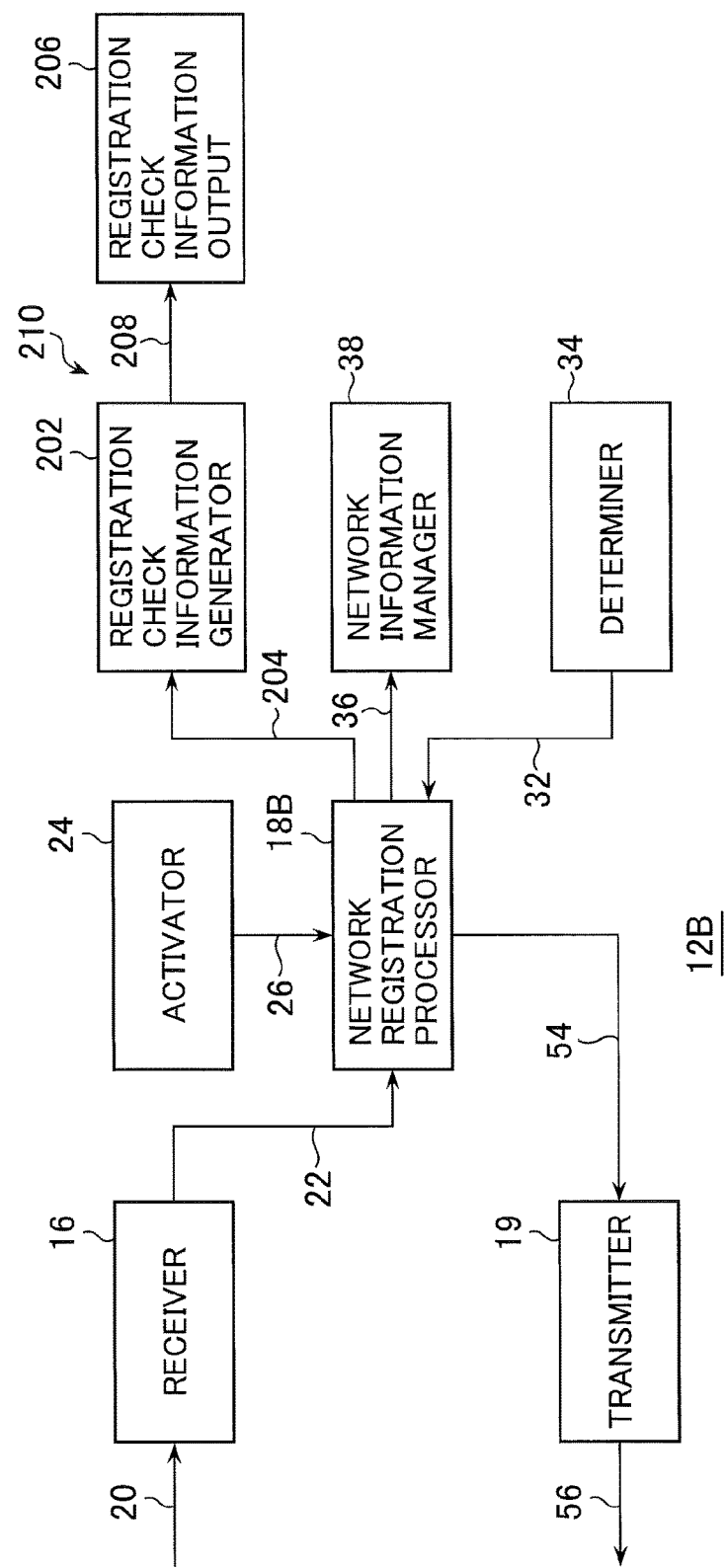
FIG. 8 is a schematic block diagram, like FIG. 1, illustrating the internal configuration of a communicator included in a further alternative embodiment.
Figure 9:
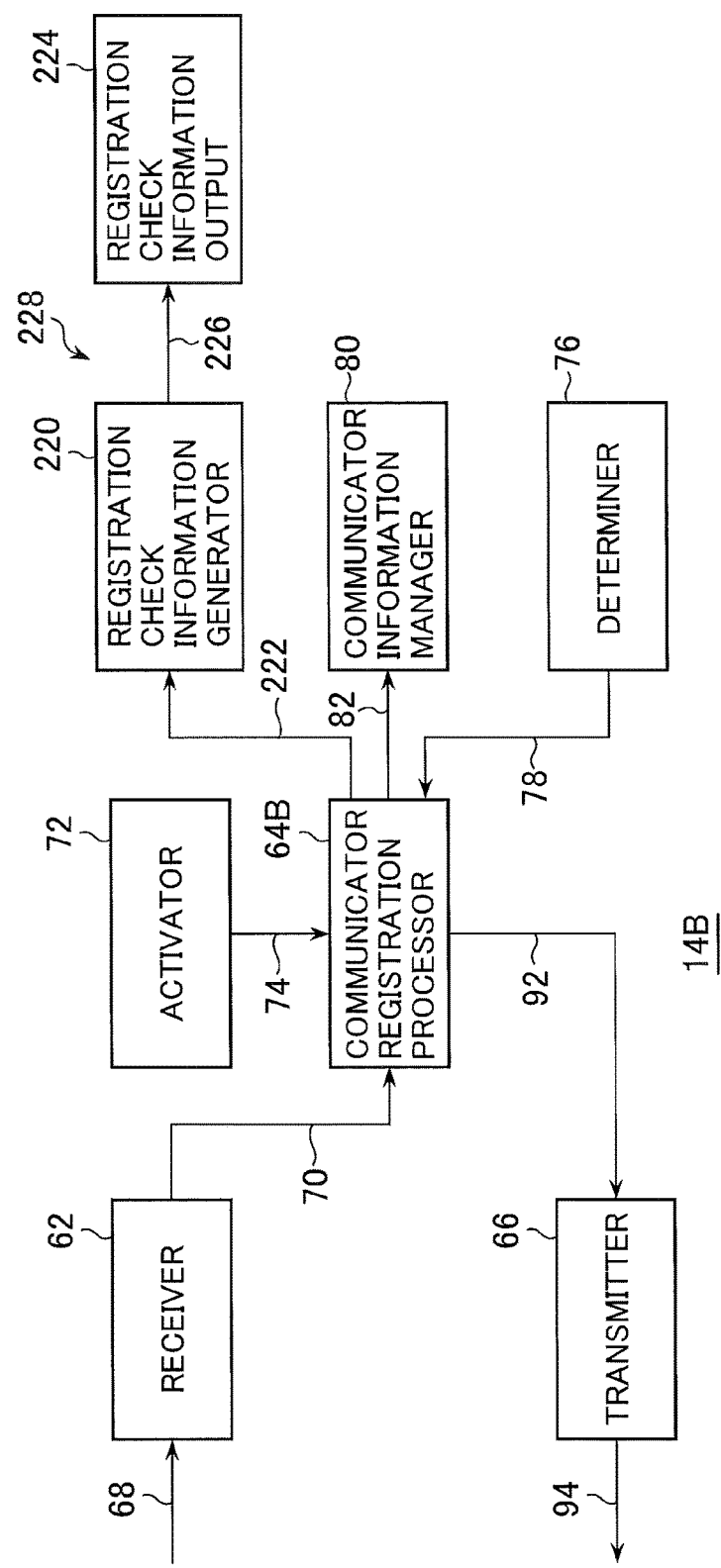
FIG. 9 is a schematic block diagram, like FIG. 2, illustrating the internal configuration of a register included in the further alternative embodiment.

As shown in FIGS. 8, 9 and 10, a network registration system 10B in the further alternative embodiment includes a communicator 12B, which may be an object to be registered, and a register 14B registering the communicator 12B.

FIG. 8 is a schematic block diagram illustrating the internal configuration of the communicator 12B in the system in the further alternative embodiment. The communicator 12B may be implemented by hardware, or alternatively or additionally by a processor system including a CPU, a ROM, a RAM and the like and adapted to execute program sequences so as to function as a communicator whereas some of the elements, such as transmitter and receiver, may at least partially be implemented in the form of hardware. Even in the latter case, the communicator 12B may be functionally represented by functional blocks as shown in FIG. 8.

The communicator 12B in the embodiment includes the receiver 16 for receiving information from the register 14B, a network registration processor 18B for processing the information which the receiver 16 receives, and the transmitter 19 for transmitting the information processed in the processor 18B to the register 14B.

As is the case with the previous embodiments, the communicator 12B includes the activator 24, the determiner 34 and the network information manager 38, which are respectively connected to the network registration processor 18B.

The communicator 12B further includes a registration check information generator 202 for generating information, or a notification, for prompting the user to confirm that the communicator 12B and the network are what he/she intends to register. The registration check information generator 202 is connected by a communication line 204 to the processor 18B to receive network information from the network registration processor 18B.

The communicator 12B further includes a registration check information output section 206 for outputting a signal for prompting the user to confirm that the communicator 12B and the network should be under registration processing. The output section 206 is connected by a communication line 208 to the registration check information generator 202 to receive the information generated by the generator 202.

In the communicator 12B, constituent elements different in structure and function from those in the previous embodiments will be described in detail. The network registration processor 18B may fundamentally be similar in structure and function to that in the previous embodiment. However, the processor 18B in the further alternative embodiment may be different from that in the previous embodiments in that the processor 18B supplies the specific information shared with the registers 14B as registration check information to the registration check information generator 202 in the registration processing. The registration check information may be or include, for example, identifications of the communicator 12B, the register 14B and/or the network.

The registration check information may be a shared key generated by exchanging keys in the authentication process. Alternatively, the registration check information may be a random number that is generated by either one of the communicator 12B and the register 14B and will be shared by being transmitted to the other.

Furthermore, the registration check information may be a count value which represents the number of times at which a button installed on the communicator 12B is depressed and will be shared by being transmitted to the register 14B.

The registration check information may be a combination of the above-mentioned information items or a value converted from the above-mentioned information which is input into the network registration processor 18B.

The registration check information generator 202 receives registration check information such as information supplied from the network registration processor 18 to generate a signal which is associated with information by which the user can confirm that the communicator 12B and the above-mentioned network are what he/she intends to be processed for registration.

The signal for use in prompting the user to conduct confirmation may not be limited to a specific type of signals. For example, in an application in which the user is prompted to confirm the registration being processed by a lighting pattern of a lamp, the lighting pattern derivable from the registration check information may be used. For example, the registration check information represents a value "3", the lamp may be blinked three times.

Alternatively, for example, a finite number of lighting patterns may be defined in advance, each of which corresponds to a hash value and a mod value derived from the registration check information, and an output signal designating one of the lighting patterns that corresponds to registration check information on the registration processing currently on going is fed to the registration check information output section 206.

Alternatively or additionally to the lighting pattern of the lamp, a sound pattern may be used for prompting the user to conduct confirmation. In this case, the registration check information may be converted to an audio signal in the registration check information generator 202, and the audio signal such as "Device No. 15" may be supplied to the registration check information output section 206.

The registration check information output section 206 is adapted to receive the signal from the registration check information generator 202 to emit the output signal in conformity with a output device included in the output section 206. The above-mentioned signal can be in the form of, for example, lighting pattern of a lamp, sound pattern or voice.

In relation to the register 14B which can output a signal for prompting the user to confirm that the register 14B and the communicator 12B are those which he/she intends to be under registration processing, it can be considered that the registration check information generator 202 and the registration check information output section 206 serve as an evaluation criterion supplier 210 for supplying evaluation criterion information which causes the user to evaluate the suitability of check information emitted from the register 14A.

In the instant further alternative embodiment, the common registration check information is output by the register and the communicator. However, the communicator check information and/or the network check information may be additionally output as with the case of the previous embodiments.

FIG. 9 is a schematic block diagram illustrating the internal configuration of the register 14B included in the registration network system in the present further alternative embodiment. Again, the register 14B may be implemented by hardware, or alternatively or additionally by a processor system including a CPU, a ROM, a RAM and the like and adapted to execute program sequences so as to function as a register whereas some of the elements, such as transmitter and receiver, may at least partially be implemented in the form of hardware. Even in the latter case, the register 14B may functionally be represented by functional blocks as depicted in FIG. 9.

Some constituent elements in the register 14B may be similar to those in the register 14 in the previous embodiment shown in FIG. 2.

As shown in FIG. 9, the register 14B in the further alternative embodiment includes the receiver 62 for receiving information from the communicator 12B, a communicator registration processor 64B for processing information which the receiver 62 receives, and the transmitter 66 for transmitting the information processed in the processor 64B to the communicator 12B. As is the case with the register 14 shown in FIG. 2, the register 14B includes the activator 72, the determiner 76 and the communicator information manager 80, which are respectively connected to the processor 64B.

Constituent elements different in structure and function from the register 14 shown in FIG. 2 will be described in detail. The register 14B includes a registration check information generator 220 for generating information for prompting the user to confirm that the register 14B and the communicator 12B are what he/she intends to registration processing. The registration check information generator 220 is connected by a communication line 222 to the communicator registration processor 64B.

The communicator registration processor 64B may fundamentally be similar in structure and function to the processor in the previous embodiments. However, the processor 64B may be different from the processor in the previous embodiments in that the processor 64B supplies specific information shared with the communicator 12B as registration check information to registration check information generator 220 in the registration processing.

The registration check information may be or include, for example, the identifications of the communicator 12B, the register 14B and the network. The registration check information may be a shared key generated by exchanging keys in the authentication process. Furthermore, the registration check information may be a random number that is produced by either of the communicator 12B and the register 14B and will be shared by being transmitted to the other.

Again, the registration check information may be a count value which represents the number of times at which a button installed on the register 14B is depressed and will be shared by being transmitted to the communicator 12B.

Also, the registration check information may be a combination of the above-mentioned information items or a value converted from the above-mentioned information which is input into the communicator registration processor 64B.

The registration check information generator 220 receives the registration check information supplied from the processor 64B to generate a signal by which the user can confirm that the register 14B and the communicator 12B are those he/she intends to be under registration processing. This signal may be similar to the signal generated by the registration check information generator 202 in the communicator 12B, FIG. 8.

The register 14B includes a registration check information output section 224 for outputting the signal for prompting the user to confirm that the register 14B and the communicator 12B are what he/she intends to be under registration processing. The registration check information output section 224 is connected by a communication line 226 to the registration check information generator 220. The output section 224 receives the signal including the information generated by the registration check information generator 220 to operate in a similar way to that of the registration check information output section 206 in the communicator 12B, FIG. 8.

In the present further alternative embodiment, the common registration check information is output by the register and the communicator. However, the communicator check information and/or the network check information may be additionally output as with the previous embodiments.

In relation to the communicator 12B comprising the registration check information generator 202 and the registration check information output section 206, it is also considered that the registration check information generator 220 and the registration check information output section 224 serve as an evaluation criterion supplier 228 for supplying evaluation criterion information which causes the user to evaluate the suitability of the check information emitted from the communicator 12B.

Next, the operation of the network registration system 10B in the present further alternative embodiment will be described in detail with reference to FIGS. 3 and 8-10 showing the system 10B including the communicator 12B and the register 14B.

FIG. 10 explanatorily depict how to causing the user to check that the communicator 12B has been registered in the network registration system 10B in the further alternative embodiment. The operation of the network registration system 10B in the present embodiment may generally be similar to that of the system 10 in the previous embodiment shown in FIG. 3. Thus, the operation in the further alternative embodiment will be described with reference to FIG. 3 as well as FIG. 10.

The general operation of the network registration system 10B in the embodiment falls into three operations as with the previous embodiments. More specifically, the three operations are an activation operation of the initial registration mode S101, a registration check operation S102 and a network connection configuration operation S103, as shown in FIG. 3. The network connection configuration operation S103 may generally be similar to that of the network registration system in the previous embodiments described above. Description will therefore be made on the activation operation of the initial registration mode S101 and the registration check operation S102, which are somewhat different from the operations performed in the network registration system in the previous embodiments.

In addition to the activation operation of the initial registration mode S101 in the previous embodiment, registration check information is shared between the network registration processor 18B in the communicator 12B and the communicator registration processor 64B in the register 14B. As described above, the registration check information may be, for example, a shared key generated in the authentication and key exchange process between the communicator 12B and the register 14B. Moreover, registration check information may be a random number that is generated by either one of the communicator 12B and the register 14B and will be shared by being transmitted to the other. Also as described above, the registration check information may be, for example, a count value which represents the number of times at which a button installed on the communicator 12B is depressed and will be shared by being transmitted to the register 14B. As described above, the registration check information may be a combination of the above-described information items, or a value converted from the registration check information.

FIG. 10 illustrates with a reference numeral 232 a case in which a count value representative of the number of times of depressing the button installed on the communicator 12B is transmitted to the register 14B so as to be rendered as shared.

The communicator 12B includes a check button 202B as a component of the registration check information generator 202. The generator 202 generates the registration check information of a lighting pattern associated with to the number of times of depressing the check button 202B. The generator 202 in turn supplies the generated information to the registration check information output section 206. The output section 206 includes a check lamp 206L, which blinks in accordance with the lighting pattern 206P of the registration check information.

The network registration processor 18B in the communicator 12B transmits the number of times of depressing the check button 202B to the register 14B through the transmitter 19. The communicator registration processor 64B in the register 14B receives the number of times of depressing the check button 202B through the receiver 62, whereby the communicator 12B and the register 14B share the registration check information, as indicated by an arrow 234 in FIG. 10.

In the wake of the activation of the initial registration mode in step S101 described above, the registration check in step S102 is performed. The registration check information generator 220 in the register 14B generates a notification for prompting the user to confirm the communicator 12B and the network he/she intends to be processed for registration. The signal generated by the generator 220 is output to the registration check information output section 224. For example, the output signal can be a lighting pattern 224P of a check lamp 224L included in the output section 224, as shown in FIG. 10. In this case, the lighting pattern 224P according to the number of times of depressing the check button 202B arranged on the communicator 12B during the registration processing is notified through the output section 224 to the user.

As described above, it is preferred that the communicator 12B under registration processing also includes the registration check information output section 206 which can emit the same signal as the signal output to the registration check information output section 224 in the register 14B.

The registration check information generated by the registration check information generator 220 in the register 14B may not be limited to the number of times of depressing the button described above. For example, the registration check information may be key information made shared in the authentication through exchanging keys between the communicator 12B and the register 14B. The lighting pattern according to key information may be output to both the registration check information output section 224 in the register 14B and the output section 206 in the communicator 12B.

It may not be necessary that the signal output to the registration check information output section 206 in the communicator 12B is completely the same as the signal output to the output section 224 in the register 14B even when those signals are associated with each other. For example, when the indicator lamp of the output section 206 in the communicator 12B blinks five times, the output section 224 in the register 14B may utter a voice "the lamp blinks five times", or may visually display a cautionary direction. The above is also the case with the illustrative embodiments described so far.

The determiner 76 in the register 14 generates a message indicating registration acceptable or unacceptable for the communicator 12B under registration processing to supply the message to the communicator registration processor 64B. The registration may be determined by the user when, for example, determining whether or not the signal delivered to the registration check information output section 206 in the communicator 12B matches information delivered to the registration check information output section 224 in the register 14B in the network to which the communicator is currently to be registered. The determination result may be input to the processor 64B. The processor 64B generates a response message of entry acceptable or unacceptable to transmit the response message through the transmitter 66 to the communicator 12B.

The network registration processor 18B in the communicator 12B receives the response message of entry acceptable or unacceptable to determine whether or not the communicator 12B has registered, or is to be registered, in the network 3B to which the communicator should be registered. Upon receiving the message of registration acceptable or unacceptable supplied from the determiner 34, the processor 18B may determine that the registration has been completed or blocked.

In summary, according to the further alternative embodiment, it is possible for the user to check whether or not the communicator 12B and the register 14B are actually under registration processing, by using a signal output according to specific information shared by the register 14B in the wireless network to which the communicator is to be registered and the communicator 12B under registration processing.

For example, when registering to a wireless network a communicator provided with a simple human interface, such as a communicator having wireless function built in and provided with a button, an indicator lamp and the like, it is possible to simply prevent an incorrect registration without utilizing sophisticated IT equipment such as a personal computer by the user.

The illustrative embodiments described so far in accordance with the invention can be modified in different ways. The invention can be exemplified as described below. The above-described embodiments are adapted such that the user may be asked for registration check before the register 14 in the wireless network determines whether or not the communicator 12 is allowed to join the wireless network. However, the present invention may not be limited to this specific way. For example, the registration check may be made after having allowed the communicator 12 to join in the wireless network. In this case, when secret information such as an authentication key has already been assigned to the communicator 12 through the entry procedure into the network, the determination of registration unacceptable is followed by a procedure in which the secret information may be made invalid if the registration is determined unacceptable, or alternatively by a procedure in which that key may be updated for another communicator when joining in the wireless network in question.

On the above-described embodiments, is has not accurately been described at which timing communicator check information, network check information and registration check information is output. However, such timing may not be limited as long as the timing is during the registration processing. For example, the information may be output upon an output button provided in the communicator or the register being depressed.

Alternative, the timing communicator check information, network check information and registration check information may be automatically output in a predetermined phase in the registration processing. In this case, for example, a provisional registration phase may be provided which can be entered when registration requirements are satisfied. In the provisional registration phase, the information may be output, and the complete registration may be executed unless the provisional registration is cancelled within a predetermined period of time since the provisional registration made.

The present invention is made in view of the problems raised when it is applied to wireless mesh networks. However, the technical idea of the present invention is not limited to wireless mesh networks but also to other telecommunications networks than wireless mesh networks.

The illustrative embodiments of the register, the communicator and the network registration system are depicted and described as configured into separate functional blocks. It is however to be noted that, as also described above, such a depiction and a description do not restrict the register, the communicator and the network registration system to an implementation only in the form of hardware but at least the register, the communicator and the network registration system may partially or entirely be implemented by software, namely, by a computer, or processor system, which has a computer program installed therein and functioning, when executed on the computer, as the register, the communicator and the network registration system. That may also be the case with the illustrative embodiments described so far.

The entire disclosure of Japanese patent application No. 2013-190598 filed on Sep. 13, 2013, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A network registration system comprising:
   a communicator to be registered on a telecommunications network; and
   a register registering said communicator on the network, wherein one of said communicator and said register comprises:
   a user input device generating input information including a pattern based on a user input including the pattern; and
   a transmitter that outputs the input information to the other of said communicator and said register,
wherein the other of said communicator and said register comprises:
   a first check information generator generating check information for prompting a user to check that said communicator is treated as an object to be registered in said network registration system based on the input information, the check information including the input information; and
   a first check information output section outputting the check information, including the pattern, in a form sensible to the user,
wherein the communicator and the register are configured to each perform an initial registration mode including an exchange of network information to permit the communicator and the register to communicate with each other over the network,
wherein the initial registration mode further includes transmitting, from the one of said communicator and said register to the other of said communicator and said register, the input information based on the user input,
wherein the first check information generator is further configured to output information, based on a media access control (MAC) address of the communicator, notifying the user that said communicator either has executed or is executing the registration mode, the output information corresponding to the least significant four bits of the MAC address of said communicator,
wherein, after completion of the initial registration mode by exchanging the network information to permit the communicator and the register to communicate with each other over the network, and after outputting the information based on the MAC address of said communicator, the communicator and the register are configured to perform a registration check to check a successful exchange of the network information, said registration check comprising outputting, by a second check information output section, the check information including the pattern included in the user input in the initial registration mode, in the form sensible to the user, and
wherein the pattern that is included in the input information during the initial registration mode and output by the second check information output section after completion of the initial registration mode is determined when the user inputs the pattern into the user input device.

2. The system in accordance with claim 1, wherein said first check information generator and said first check information output section are included in said register, and said user input device and said transmitter are included in said communicator, and
   the check information generated by said first check information generator includes identification information identifying said communicator treated as the object to be registered.

3. The system in accordance with claim 1, wherein said first check information generator and said first check information output section are included in said communicator, and said user input device and said transmitter are included in said register, and
   the check information generated by said first check information generator includes identification information identifying the network in which the object to be registered is to be registered.

4. The system in accordance with claim 1, wherein said register further comprises a determiner configured to transmit a message indicating that registration is acceptable or unacceptable based on a user input, after outputting, by the first check information output section, the check information including the pattern.

5. The system in accordance with claim 1, wherein said communicator further comprises a determiner configured to transmit a message indicating that registration is acceptable or unacceptable based on a user input, after outputting, by the first check information output section, the check information including the pattern.

6. The system in accordance with claim 1, wherein said first check information output section emits the check information in at least one of a visual and auditory manner.

7. The system in accordance with claim 1, wherein
   the user input device includes a button;
   the pattern includes a number of times of depressing the button.

8. The system in accordance with claim 1, wherein the output information corresponds to a remainder obtained by dividing a value of the MAC address of the communicator by a number of lighting patterns.

9. A network device for use in a network registration system, said network registration system comprising a communicator to be registered on a telecommunications network and a register registering the communicator on the network, said network device comprising:
   a check information generator generating check information based on input information outputted from another network device that executes a registration process cooperatively with the network device, the check information including the input information, and the input information including a pattern based on a pattern of a user input having been entered on a user input device on the another network device;
   a check information output section outputting the check information, including the pattern, in a form sensible to the user; and
   a registration processor configured to perform an initial registration including an exchange of network information to permit the communicator and the register to communicate with each other over the network,
wherein the registration processor is configured to receive the input information during the initial registration,
wherein the check information output section is further configured to output information, based on a media access control (MAC) address of the network device, notifying the user that said network device either has executed or is executing the initial registration, the output information corresponding to the least significant four bits of the MAC address of said network device,
wherein said registration check comprises outputting the check information including the pattern by a second check information output section after completion of the initial registration including the exchange of network information to permit the communicator and the register to communicate with each other over the network, and after outputting the information based on the MAC address of said network device, wherein said network device including the check information generator and the check information output section is one of the communicator to be registered on the telecommunications network and the register, and wherein the pattern that is included in the input information during the initial registration mode and output by the second check information output section after completion of the initial registration mode is determined when the user inputs the pattern into the user input device.

10. The network device in accordance with claim 9, wherein the check information generated by said check information generator includes identification information identifying the communicator treated as the object to be registered.

11. The network device in accordance with claim 9, wherein the check information generated by said check information generator includes identification information identifying the network in which the object to be registered is to be registered.

12. The network device in accordance with claim 9, further comprising a determiner configured to transmit a message indicating that registration is acceptable or unacceptable based on a user input, after outputting, by the first check information output section, the check information including the pattern.

13. The network device in accordance with claim 9, wherein
the pattern includes a number of times of depressing a button included in the other network device.

14. A network device for use in a network registration system, the network communication system comprising a communicator to be registered on a telecommunications network and a register registering the communicator on the network, said network device comprising:
a user input device generating input information including a pattern based on a user input including the pattern; and
a transmitter that outputs the input information to another network device that executes a registration process cooperatively with the network device,
wherein the network device is one of the communicator and the register and the other network device is the other of the communicator and the register,
wherein the communicator and the register are configured to each perform an initial registration mode including an exchange of network information to permit the communicator and the register to communicate with each other over the network,
wherein the initial registration mode includes transmitting, by the transmitter, the input information from the network device to the another network device,
wherein the transmitter is configured to output information, based on a media access control (MAC) address of the network device, notifying the user that said network device either has executed or is executing the initial registration mode, the output information corresponding to the least significant four bits of the MAC address of said network device,
wherein, after the initial registration mode including the exchange of network information to permit the communicator and the register to communicate with each other over the network, and after outputting the information based on the MAC address of said network device, the communicator and the register are configured to perform a registration check to check a successful exchange of the network information, said registration check comprising outputting, by a check information output section in the other network device, check information including the input information outputted from the transmitter, the input information including the pattern input by the user into the user input device, and
wherein the pattern that is included in the input information during the initial registration mode and output by the check information output section after completion of the initial registration mode is determined when the user inputs the pattern into the user input device.

15. The network device in accordance with claim 14, further comprising a determiner configured to transmit a message indicating that registration is acceptable or unacceptable based on a user input, after the first check information output section outputs the check information including the pattern.

16. The network device in accordance with claim 14, wherein
the user input device includes a button;
the pattern includes a number of times of depressing the button.

* * * * *

UNITED STATES PATENT AND TRADEMARK OFFICE
CERTIFICATE OF CORRECTION

PATENT NO. : 10,212,584 B2
APPLICATION NO. : 14/307823
DATED : February 19, 2019
INVENTOR(S) : Taketsugu Yao et al.

Page 1 of 1

It is certified that error appears in the above-identified patent and that said Letters Patent is hereby corrected as shown below:

On the Title Page

Item (30) (Foreign Application Priority Data)
Please add:
-- (30) Foreign Application Priority Data
September 13, 2013 (JP) 2013-190598 --

Signed and Sealed this
Fourth Day of June, 2019

Andrei Iancu
*Director of the United States Patent and Trademark Office*